US011172035B2

(12) United States Patent
Reineke et al.

(10) Patent No.: US 11,172,035 B2
(45) Date of Patent: Nov. 9, 2021

(54) DATA MANAGEMENT FOR EDGE COMPUTING ENVIRONMENT

(71) Applicant: EMC IP Holding Company LLC, Hopkinton, MA (US)

(72) Inventors: Nicole Reineke, Northborough, MA (US); James R. King, Norwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 66 days.

(21) Appl. No.: 16/514,424

(22) Filed: Jul. 17, 2019

(65) Prior Publication Data

US 2021/0021676 A1 Jan. 21, 2021

(51) Int. Cl.
*H04L 29/08* (2006.01)

(52) U.S. Cl.
CPC .............. *H04L 67/18* (2013.01); *H04L 67/10* (2013.01)

(58) Field of Classification Search
CPC .......... H04L 67/00; H04L 67/18; H04L 67/10
See application file for complete search history.

(56) References Cited

U.S. PATENT DOCUMENTS

| 10,262,019 B1 | 4/2019 | Reiner et al. | |
| 2013/0124574 A1* | 5/2013 | Brettin | G06F 16/9024 |
| | | | 707/798 |
| 2016/0323198 A1* | 11/2016 | Rencher | H04L 47/74 |
| 2016/0381087 A1* | 12/2016 | Addepalli | G06F 16/2477 |
| | | | 709/223 |
| 2017/0033834 A1* | 2/2017 | Gross | H04B 3/52 |
| 2019/0035018 A1* | 1/2019 | Nolan | G06Q 20/36 |
| 2019/0141536 A1* | 5/2019 | Bachmutsky | H04L 67/10 |
| 2019/0392328 A1* | 12/2019 | Gil Bulacio | G06N 5/046 |
| 2020/0158810 A1* | 5/2020 | Zhang | H04W 64/003 |
| 2020/0177590 A1* | 6/2020 | Levy | H04L 63/10 |
| 2020/0296007 A1* | 9/2020 | Finn, II | H04L 43/045 |

OTHER PUBLICATIONS

Wikipedia Contributers, "Edge computing," Wikipedia, The Free Encyclopedia; Jul. 14, 2019, 13:01 UTC [cited Jul. 17, 2019], Available from: https://en.wikipedia.org/w/index.php?title=Edge_computing&oldid=906223234.

* cited by examiner

*Primary Examiner* — Minh Chau Nguyen
(74) *Attorney, Agent, or Firm* — Ryan, Mason & Lewis, LLP (57) ABSTRACT

In an edge data management methodology, first information is obtained pertaining to a given data set associated with a computing environment, wherein the computing environment comprises one or more edge computing networks and one or more centralized computing networks. Second information is obtained that is descriptive of processing functionalities available at the one or more edge computing networks. Third information is obtained that is descriptive of processing functionalities available at the one or more centralized computing networks. A processing location decision is generated for at least a portion of the given data set based on the obtained first, second and third information. Time cost information may also be obtained that is associated with processing of at least a portion of the given data set, and used to generate the processing location decision.

20 Claims, 7 Drawing Sheets

DATA MANAGEMENT FOR EDGE COMPUTING ENVIRONMENT

FIELD

The field relates generally to computing environments with edge computing networks, and more particularly to data management in such computing environments.

BACKGROUND

Computing environments frequently employ cloud computing platforms, where "cloud" refers to a collective computing infrastructure that implements a cloud computing paradigm. For example, cloud computing is a model for enabling ubiquitous, convenient, on-demand network access to a shared pool of configurable computing resources (e.g., compute, memory, storage) that can be rapidly provisioned and released with minimal management effort or service provider interaction.

Enterprises such as corporations typically utilize a cloud computing environment to manage their applications, services and data. One or more cloud platforms that are part of this environment may be within the exclusive control and management of the enterprise, and therefore are considered "private clouds." On the other hand, the cloud computing environment can include one or more cloud platforms that can be used by multiple enterprises (tenants or customers), and that are not necessarily controlled or managed by any of the multiple enterprises but rather are controlled and managed by one or more third-party cloud providers. Such cloud platforms are typically considered "public clouds." More typically, enterprises may choose to host their applications, services and data on a combination of multiple clouds that form a "multi-cloud computing environment." A multi-cloud computing environment that includes one or more public clouds and one or more private clouds is sometimes referred to as a "hybrid cloud computing environment." Note also that one or more cloud platforms can form what is known as a "data center." Thus, in some scenarios, a multi-cloud computing environment can include multiple data centers.

In some scenarios, the computing environment can also include one or more edge computing networks. Edge computing is a decentralized data processing paradigm which effectively moves applications, data and computing services away from a centralized point (cloud platforms or data centers) to locations closer to the end users (edge devices). While edge computing networks can operate separate from any cloud platform or data center, such edge computing networks, or at least one or more components of an edge computing network, typically interact with one or more cloud platforms or data centers. Management of edge data (data associated with the one or more edge networks) can present significant challenges.

SUMMARY

Embodiments of the invention provide techniques for improved data management in a computing environment with one or more edge computing networks.

For example, in one embodiment, a method comprises the following steps. First information is obtained pertaining to a given data set associated with a computing environment, wherein the computing environment comprises one or more edge computing networks and one or more centralized computing networks. Second information is obtained that is descriptive of processing functionalities available at the one or more edge computing networks. Third information is obtained that is descriptive of processing functionalities available at the one or more centralized computing networks. A processing location decision is generated for at least a portion of the given data set based on the obtained first, second and third information. In one or more embodiments, time cost information is obtained that is associated with processing of at least a portion of the given data set, and is used to generate the processing location decision.

Advantageously, illustrative embodiments provide for methods of determining data set processing based on data sets, location, variance-by-variable impact, and cost variants against weighting for edge processing versus bringing the data to a coalescence location for large data sets.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

The rise of edge computing and 5G cellular environments which support Internet of Things (IoT) devices requires an improved methodology for managing edge data. For example, it would be beneficial to determine the processing location, time, cost and value for processing full data sets versus subsets of data sets at edge locations versus coalescence of data in secondary location(s) versus centralized processing with a shortcut for large sets. Maintaining adequate Service Level Agreements (SLAs) and effectively utilizing the resources available with the rapid expansion of of device count and dataset size will become of utmost concern to service providers and customers running services in provided edge computing environments.

Modern application programs ("applications"), e.g., IoT and Artificial Intelligence/Machine Learning (AIML), utilize data collected from disparate sources and locations for processing. Typical implementations of such modern applications bring all data back to a central location for processing or push all processing to the end points (edge devices) without economic decisions of time, distribution cost, and variance/value/cost assessment per data for data processing.

There are varying levels of cost to data processing, varying degrees of value to the data, and no effective methods of automated identification and processing management.

More particularly, in such existing computing environments, several specific challenges arise as will now be described:

(i) Cost-to-value analysis methods for complex data processing do not include adequate automated data processing decision making techniques. Most data allocation/caching methodologies are manual and/or highly influenced by human design decisions. There is little standardization on methods for modeling and executing data movement. Looking at only binary all or one processing and data locality limits the users' economic choices. Users need to understand data coalescence opportunities, data value, and cost.

(ii) Data within data sets have varying statistical significance and data gathering does not bound statistically significant results by cost. Depending on the data which is being processed, there is likely a subset of data of statistical significance which is of critical import to include in processing. Identification of processing decision making does not currently take into account the statistical significance of the data for gathering in relation to the cost of processing.

(iii) Data weighting and significance for reducing the cost of training set aggregation. AIML training sets do not require the level of completeness that is required for production data analysis. The ability to gather the lowest cost data will significantly reduce the initial costs of development for non-critical applications.

Illustrative embodiments address the above and other challenges by providing improved data management in a computing environment with one or more edge computing networks. More particularly, illustrative embodiments provide for methods of determining data set processing based on data sets, location, variance-by-variable impact, and cost variants against weighting for edge processing versus bringing the data to a coalescence location for large data sets.

Figure 1:
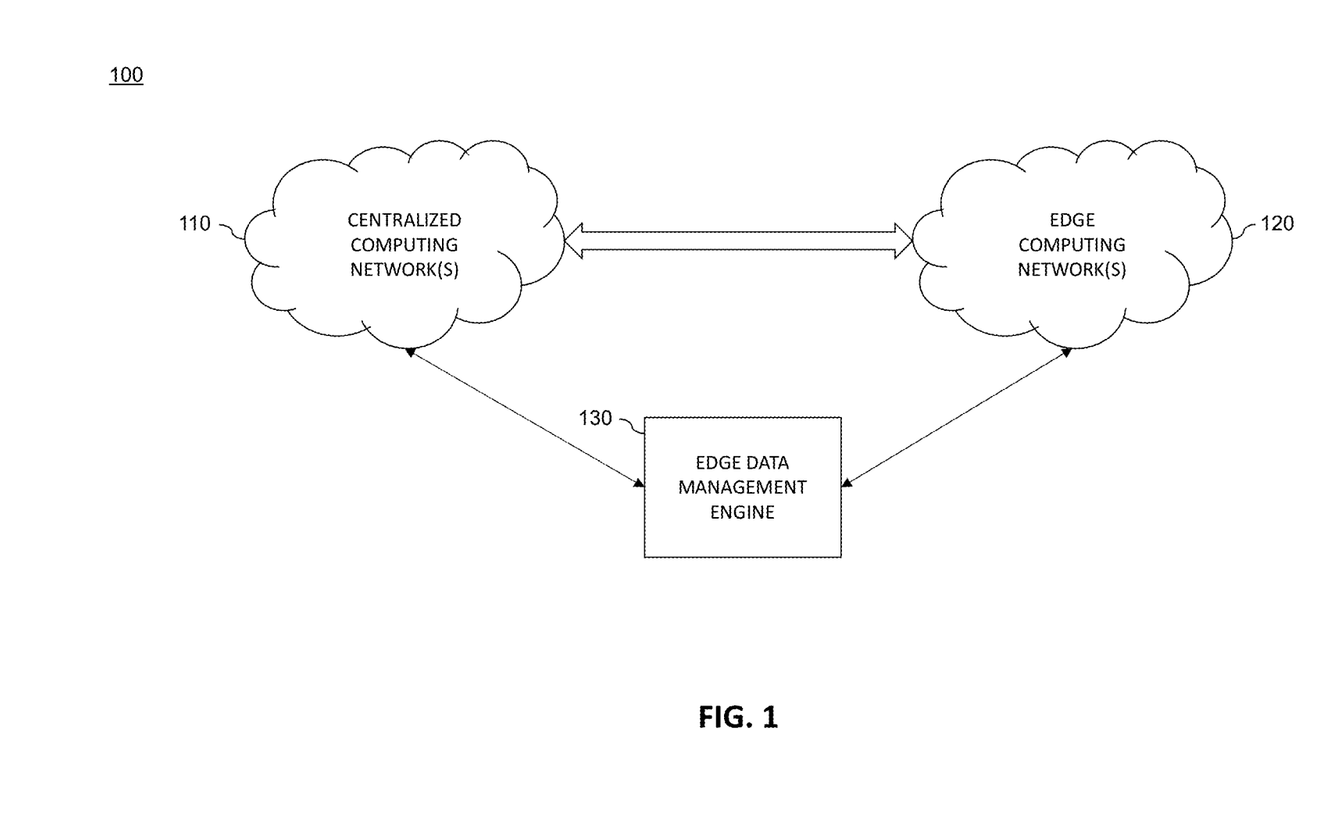
FIG. 1 is a block diagram of an architecture for edge data management in a computing environment, according to an embodiment of the invention.

Turning now to FIG. 1, an exemplary computing environment 100 is depicted with improved edge data management, according to an embodiment of the invention. As shown in computing environment 100, one or more centralized computing networks 110 (clouds or data centers) are operatively coupled to one or more edge computing networks 120. An edge data management engine 130 is operatively coupled to the one or more centralized computing networks 110 and the one or more edge computing networks 120.

As will be further explained below, edge data management engine 130 provides the functionalities of edge data management described herein. Edge data management engine 130 communicates with computing nodes/devices in the one or more centralized computing networks 110 and the one or more edge computing networks 120 to perform these functionalities. In some embodiments, edge data management engine 130 is implemented in one or more of the computing devices of the edge computing networks 120, while in other embodiments, edge data management engine 130 is implemented in one or more standalone computing devices. In further embodiments, edge data management engine 130 is implemented partly in one or more standalone computing devices and partly in one or more of the computing devices of the edge computing networks 120. In alternative embodiments, one or more of the functionalities of edge data management engine 130 are implemented in one or more of the computing devices (compute nodes) of the centralized computing networks 110.

For example, in one or more illustrative embodiments, edge data management engine 130 is configured to perform a value analysis methodology for complex data processing automation. Most existing data allocation/caching methodologies are manual and/or highly influenced by human design decisions. There is no standardized method for modeling and executing edge data movement.

Illustrative embodiments provide a methodology to determine the cost of gathering and processing edge data, compare the cost to the statistical significance of data items within a data set, and determine a data management decision for each data item. For example, in one or more illustrative embodiments, edge data management decisions for a given data item include processing the data item within the edge computing network, moving the data item and coalescing the data item with one or more other data items within the edge computing network 120 or outside the edge computing network (e.g., centralized computing network 110 and/or an intermediate location between the edge computing network 120 and the centralized computing network 110), and/or neither processing nor moving/coalescing the data item (e.g., leaving the data item at the source edge device). Other edge data management decisions are contemplated in accordance with alternative embodiments. Each decision is made by the engine 130 based on one or more decision criterion which will be further explained herein.

This edge data management methodology enables automated, cost-effective decision making on processing points and data movement for large data sets while maintaining statistical significance. Data variants for use in identification of data subsets of significance, pre-processing capabilities, and sub-results are stored for optimization for large data sets. Enabling multi-stage decision and data sub-segmentation against statistical significance expands the scatter-gather processing to enable smarter data subsets, multiple gather sites with scattered secondary processing, and centralized processing where it makes economic sense.

In one or more illustrative embodiments, another key aspect of this methodology is a feedback loop that caches historical cost minimization solutions. This historical feedback loop is an input into subsequent calculations to create data gravity and ensure the variation from calculation to calculation is not detrimentally significant. The activation functions necessary for each aspect of this feedback loops are dependent on the status of end devices so that transient endpoints would not be considered in follow up calculations.

For example, illustrative embodiments take into consideration one or more of the following when making an edge data management decision via edge data management engine 130:

Total data required for the training or data set:
Data variables;
Weighted value for variable variance:
Data value in relation to overall data set statistical significance
Data locality:
Mapped locations of all data points (IoT, data centers, cloud locations) with data point data size;
Data point processing capabilities;
Connectivity capability
Required resources for processing—if it can be broken down; sub-data processing requirements versus total data processing requirements versus grouped processing requirements:
Map of data points against processing requirements (which locations exist, which are powerful enough to perform the processing required, e.g., is the process able to be run against an edge device versus requiring 40 Graphics Processing Units or GPUs)
Relative Cost:
Cost of time;
Cost of processing;
Cost of post-processing;
Note that processing is running the initial algorithms or functions against the data. In an instance of data that calculates something such as average temperature, processing may be the determination of the total data points on the local device and calculating the average of those data points—the information sent back to the central management location would be average value and total number of values (instead of sending back all of the independent values). Post-processing would be the final processing of all sets of average values (so if average temperature of group A is 100 across three devices, and the average temperature of group B is 20 across one device, the post-processing would calculate the cumulative average as (100*3+20*1)/4=average of 80 across all devices.
Output:
Coalesced possible processing points—mapped by gravity/relative location to data;
Time versus cost of processing at edge locations versus breakout to sub-processing stations versus coalescence to a single location for a data set of statistical significance;
Best case recommendation: data set of highest statistical significance versus cost of data processing.

With this methodology, scheduling of tasks would not just consider standard CPU/Memory considerations but also one or more aspects mentioned above. This hyper-optimization of the data processing tasks creates a significantly more economic approach to data pipeline scheduling. The overall implementation of the methodology introduces of an inventory component, metric collection component, and a cost analysis component which are embodied in the edge data management engine 130. In one or more illustrative embodiments, the cost analysis is continuously updated to reflect a graph-based view of the environment and data value with edges and vertices reflecting the estimated data value versus time to process, an example of which will be illustrated below. This information can then be used within a standard cluster scheduler or within a separate scheduler to hint workload placement and/or data movement requirements.

Figure 2A:
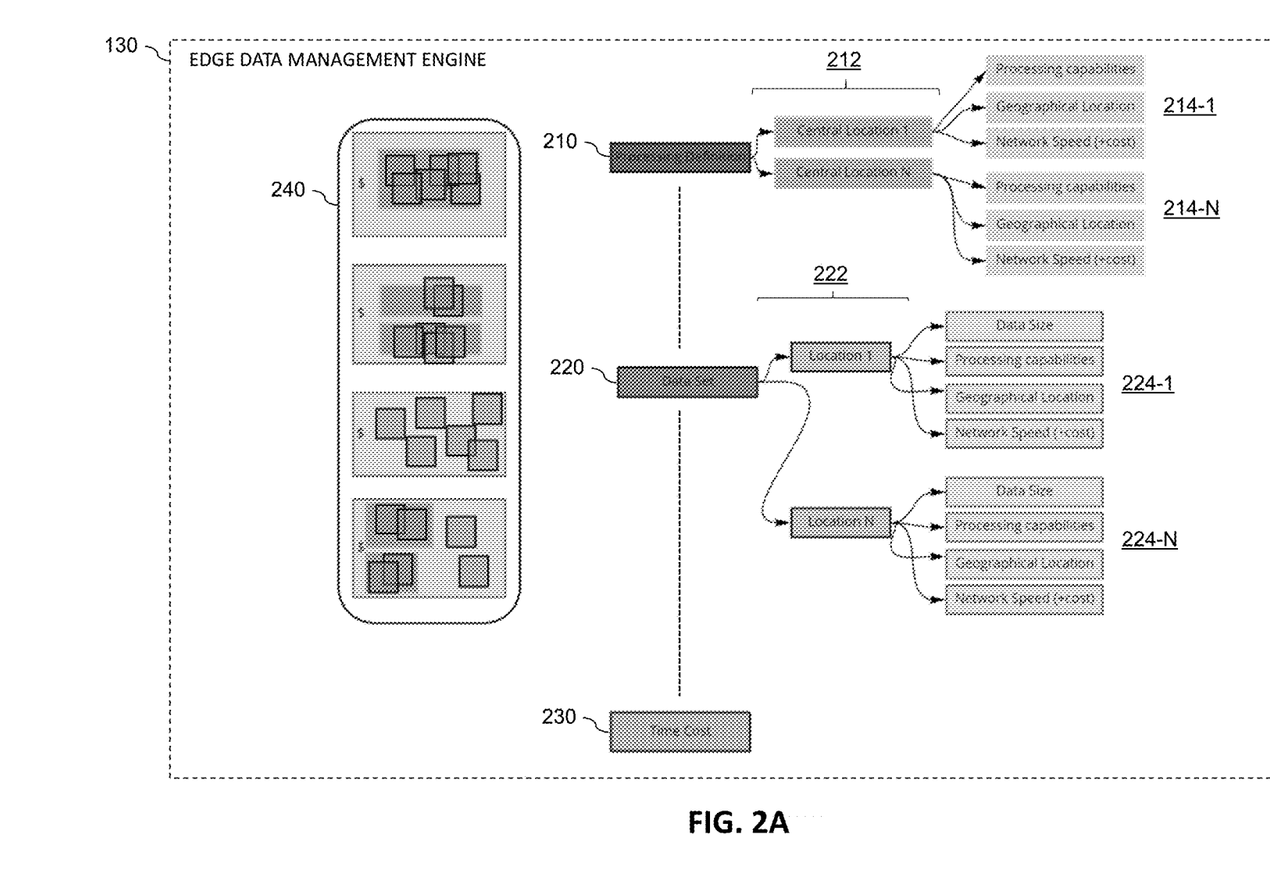
FIG. 2A is a block diagram of an architecture for an edge data management engine, according to an embodiment of the invention.

Functionalities of edge data management engine 130 are further illustratively depicted in FIG. 2A. As shown, edge data management engine 130 inputs (obtains) processing definitions 210 from a plurality of central locations 212 (e.g., N compute nodes in the one or more centralized computing networks 110). Examples of these processing definitions for each centralized location 1-N (214-1 through 214-N) include processing capabilities, geographical location, and network speed plus cost. Such definitions can also include processing time for an initial run of a data set of a given data size, storage requirements for the given data size, and re-composition/post-processing overhead. Further, edge data management engine 130 inputs (obtains), for one or more given data sets 220, data and processing definitions from a plurality of edge device locations 222 (e.g., N edge devices in the one or more edge computing networks 120). Examples of these data and processing definitions for each edge device location 1-N (224-1 through 224-N) include data size, processing capabilities, geographical location, and network speed plus cost. Edge data management engine 130 further inputs (obtains) a time cost definition 230, e.g., relative cost of time including, but not limited to, overhead for delay of processing (e.g., $X per millisecond). With these inputs, edge data management engine 130 performs the above-mentioned cost analysis and generates a graph-based view 240 of the overall computing environment (100 in FIG. 1) reflecting the estimated data value versus time to process. These output sets also act as a cache/seeding for further calculations as explained below.

From this result, the engine 130 makes edge data management decisions for a given item (data set or subset of data set) such as, by way of example, processing the data item within the edge computing network (e.g., one or more of the edge device locations 222), moving the data item and coalescing the data item with one or more other data items within the edge computing network or outside the edge computing network (e.g., one or more centralized locations 212 and/or an intermediate location between the edge computing network and the centralized computing network (not expressly shown)), and/or neither processing nor moving/coalescing the data item (e.g., leaving the data item at the source edge location).

In one illustrative embodiment, an edge data coalescence algorithm executed by edge data management engine 130 comprises the following calculations:
Relative cost of centralizing data:
For all locations against each known central location:
SUM (Location cost of transfer*Data Size) plus (Time to Transfer*Time Cost) plus (Processing time*Time Cost);
Output creates views:
Total cost for everything to location 1:N; and
Ideal location N.
Relative cost of decentralizing data:
For all locations where processing capabilities≥required processing: SUM (Time to Process for Location) (Time Cost) plus (time to transfer results*Time Cost) plus (cost to transfer results) plus (Post Processing*Time Cost) plus relative cost of centralizing data for locations not meeting processing requirements.
Relative cost of sub-grouped optimization:
For each location with processing capabilities:
Compare relative cost of decentralized data against relative cost of centralizing data for each known central location;
Identify lowest cost option; and Add to Processing Location N Array (e.g., the dark shaded boxes group the independent boxes in view 240, in the top example, the array is all of the boxes; in the second set, there are two arrays, etc.).

For each location without processing capabilities:

Consider relative cost of centralizing data for each known central location;

Identify lowest cost option;

Add to Processing Location N Array.

Output of the edge data coalescence algorithm: fully optimized data processing point definition, e.g., where in the overall computing environment (100 in FIG. 1) is the best location to process a given data item.

Figure 2B:
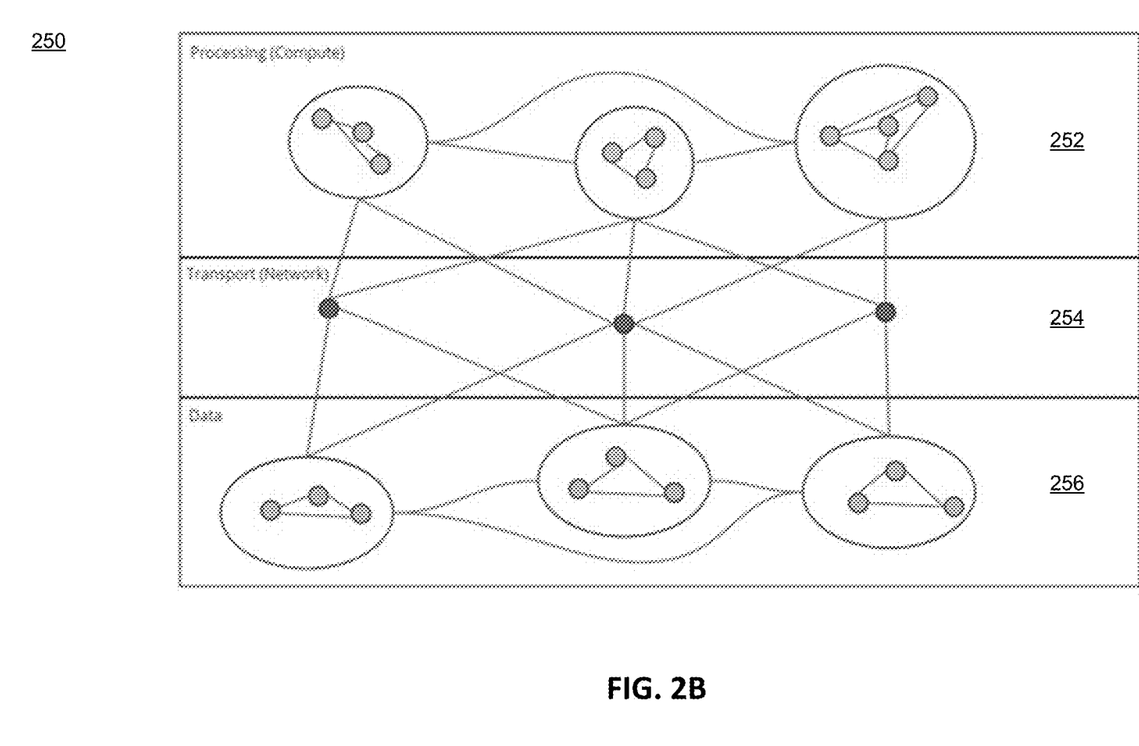
FIG. 2B is a diagram of a graph-based view of a computing environment, according to an embodiment of the invention.

FIG. 2B is a diagram of a graph-based view of a computing environment, according to an embodiment of the invention. As shown, graph-based view 250 represents a relatively simple example of how state is stored across boundaries between different layers, e.g., processing (compute), transport (network), and data, of graph-based view 250. Within compute layer 252, connections are weighted for workload mobility. Further, in compute layer 252, processing is clustered (circled) when compute nodes can be used for multi-processing with negligible state sharing cost. Each node in compute layer 252 is annotated with capabilities, power efficiency, etc. In transport layer 254, a many-to-many mapping of cost for all shards into the network to all potential endpoints is shown. Each connection in transport layer 254 is annotated by cost calculated by combining utilization, capabilities, and cost. Within data layer 256, connections are weighted for array level transfer efficiency capabilities. Further, in data layer 256, data shards are clustered (circled) when effective cost between them is negligible. Still further, each node in data layer 256 is annotated with metadata (e.g., size, etc.). Processing within layer 256 includes analysis/pre-processing to adjust network weights for egress of data sets to the compute layer 252.

Accordingly, each connection (edge) is updated with an aggregate of multiple values to advertise the cost of processing (compute cost) to all affected parties. When the costs are linearized, a graph in FIG. 2C would result, providing an easy linearization of the value.

Figure 2C:
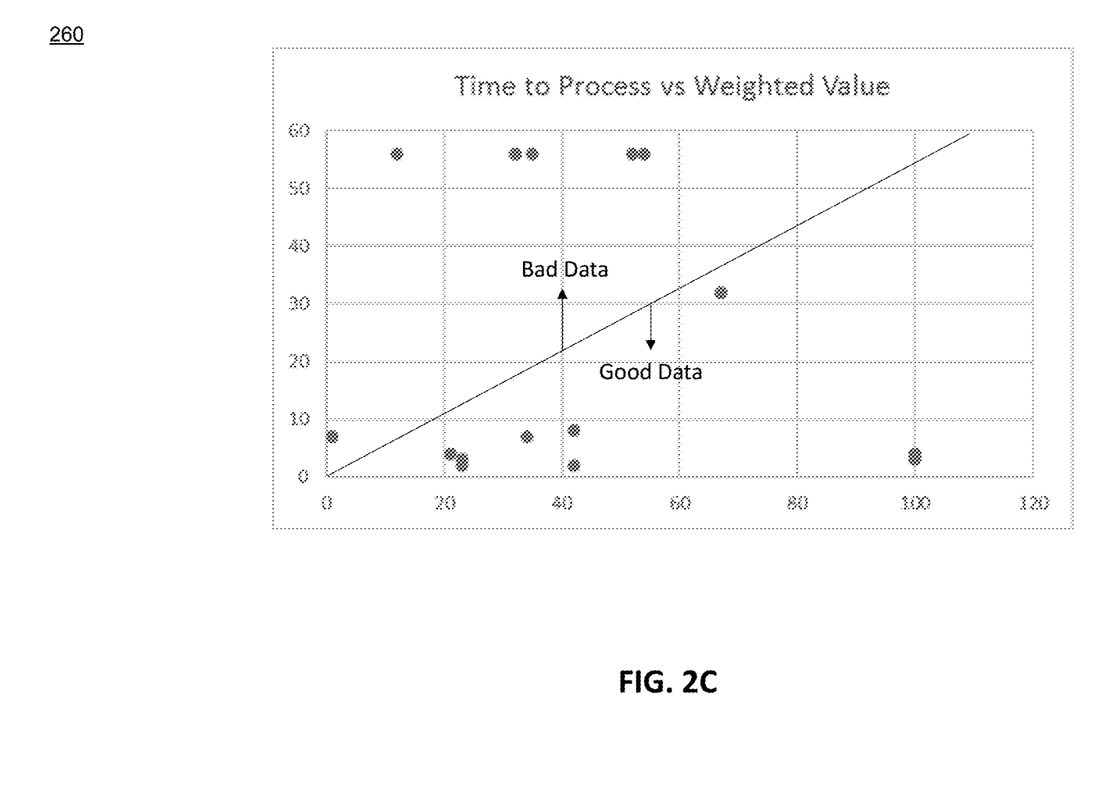
FIG. 2C is a diagram of time to process versus weighted value resulting from a graph-based view of a computing environment, according to an embodiment of the invention.

More particularly, FIG. 2C is a diagram of time to process versus weighted value resulting from a graph-based view of a computing environment, according to an embodiment of the invention. As graph 260 illustrates, the higher the value of the data, the more time you are willing to take to process the data. For example, in this instance, the horizontal value is the value of the data on a scale of 1-100, and the time for processing is the vertical scale. The line for processing cutoff is a linear calculation whereby processed data is any value under the line ("good data") and any data point over the line is considered "bad data." Advantageously, edge data management decisions by edge data management engine 130 can be made from the graphical data depicted in FIGS. 2B and 2C.

In further illustrative embodiments, data subset coalescence based on a cost for AIML training sets is performed. Sub-segments of AIML data processing do not require full data set access for all activities (such as algorithm training). Using the cost value analysis methodology described above (and illustrated in the FIG. 2A embodiment), plus variance requirements, edge data management engine 130 identifies the lowest cost mechanism to supply data scientists with a percentage of the data that they determine to be statistically significant. The feedback loop mechanism uses additional parameters to pass back the accuracy of the trained models. This embodiment is leveraged to influence the value analysis of different data endpoints and their placement/prioritization in the overall AIML training process.

Figure 2D:
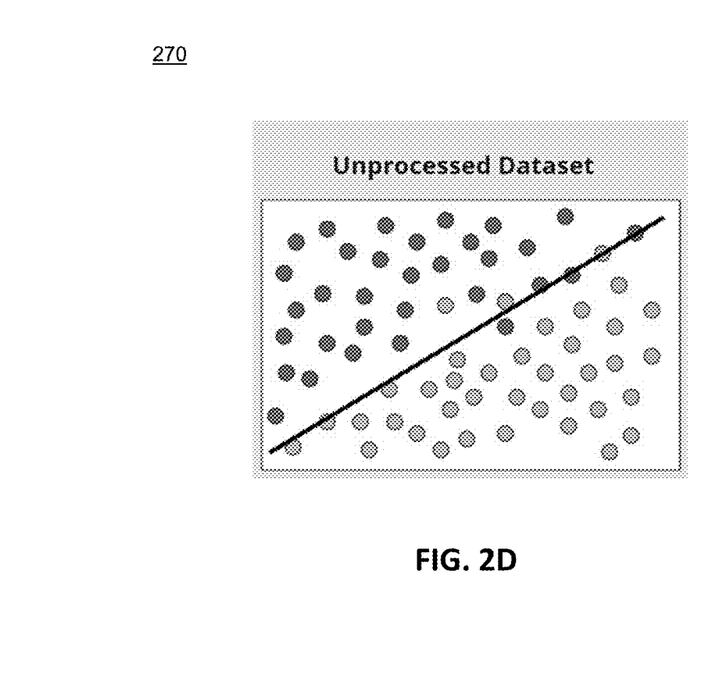
FIGS. 2D and 2E are respective diagrams of before and after representations of an implementation of a data reduction feedback loop mechanism, according to an embodiment of the invention.
Figure 2E:
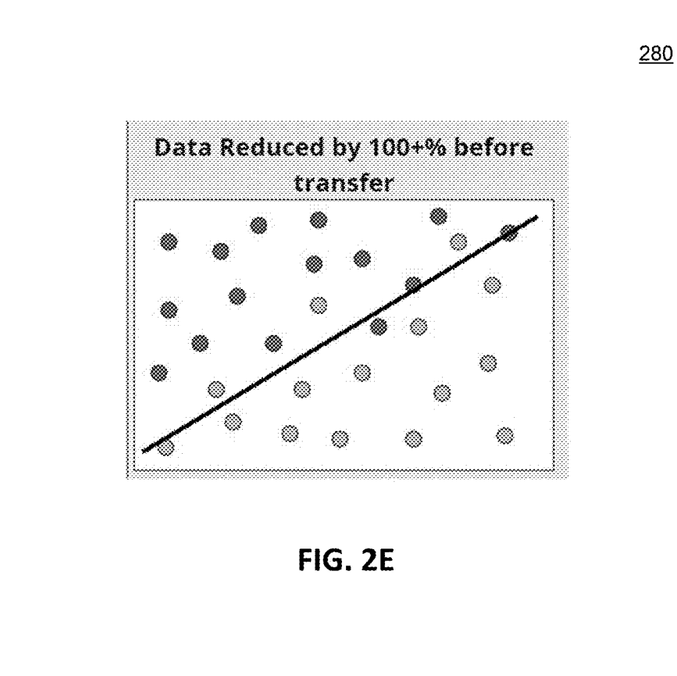

FIGS. 2D and 2E are respective diagrams of before (270) and after (280) representations of an implementation of a data reduction feedback loop mechanism, according to an embodiment of the invention. Some embodiments tie data reduction techniques into the overall scheduler/data management protocol. For the sake of AIML training, there becomes sufficiently diminishing returns for data points if they are repeated and/or not variant enough to affect the overall outcomes. FIG. 2D shows a graphical representation 270 of unprocessed data (with a line denoting that data there below is to be processed—similar to the line described above in FIG. 2C) while FIG. 2E shows a graphical representation 280 of the data from FIG. 2D reduced by some percentage prior to data movement. Data reduction improves transfer efficiency by essentially running pre-processing of the data set pre-request.

Figure 3:
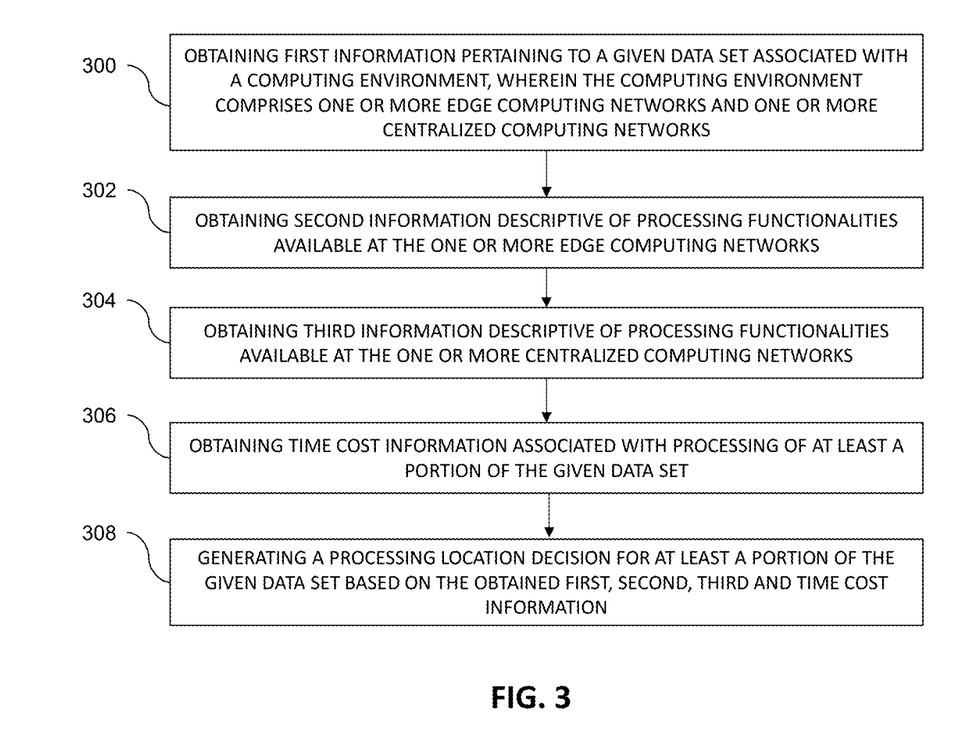
FIG. 3 is a flow diagram of an edge data management methodology in a computing environment, according to an embodiment of the invention.

FIG. 3 is a flow diagram of an edge data management methodology in a computing environment, according to an embodiment of the invention.

As shown, in step 300, first information is obtained pertaining to a given data set associated with a computing environment, wherein the computing environment comprises one or more edge computing networks and one or more centralized computing networks.

In step 302, second information is obtained that is descriptive of processing functionalities available at the one or more edge computing networks.

In step 304, third information is obtained that is descriptive of processing functionalities available at the one or more centralized computing networks.

In step 306, time cost information is obtained that is associated with processing of at least a portion of the given data set.

In step 308, a processing location decision is generated for at least a portion of the given data set based on the obtained first, second, third and time cost information.

The particular processing operations and other system functionality described in conjunction with FIGS. 1, 2 and 3 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

The following are some non-limiting illustrative use cases with which the above-described edge data management architecture and methodologies can be applied in some embodiments.

Use case 1: Progressive Web Applications (PWAs) on mobile devices. PWAs exist under the context of leveraging localized storage for most processing and only sending data deltas to the upstream data center service. The synchronization of data between multiple devices (e.g., a Google Docs scenario) is therefore limited by the connection between all parties and the central data center. This requires that all data changes must be sent to the central authority and then rectified on all clients. With a 5G tower-based solution, individuals sitting in the same room/building would only need to do data set updates to the tower implementation which would be able to perform metadata handoff between the tower and central data center. The data would be able to inform the central data center implementation of the delta speeds and the overall connectivity situation. Embodiments described herein would be used to determine relative cost, risk, etc., associated with deferred versus immediate synchronization and how that impacts application SLAs. This control path would be able to then inform the end-device, intermediate application, and the central data center application how data should be processed. In a majority edge environment, requisite processing tasks such as document tokenization and analysis could be dynamically provisioned to the tower and/or to the end-devices. The document itself could be scattered between the devices and coalesced at the nearest upstream to save bandwidth and deliver more immediate results.

Use case 2: Car behavioral analysis. Assume that an automobile company would like to run diagnostics of a car behavioral pattern for short-term diagnosis of larger patterns and needs an automated way to determine if the information is best processed within each automobile versus running against centralized processing utilities. Embodiments described herein provide the functionalities in which a company can measure and schedule data processing tasks. With smaller subset calculations, statistically insignificant data can be reduced for the final coalesced calculations at a central data center. This measurement process would then inform additional decisions such as the enabling/disabling of metric collection on specific sensors or interval configuration to ensure only statistically significant data is collected.

Use case 3: IoT-based telemetry collection and normalization. Many IoT devices are small consumer type electronics connected to the Internet via low-grade consumer networks that have no Quality-of-Service (QoS) or mediocre SLAs. These devices also tend to be ephemeral in their connectivity, appearing and disappearing from the active network's state. As part of providing services and support, collection of telemetry data is necessary to support an ethical product lifecycle. In collecting large sets of telemetry data, the data must be normalized and aggregated to obtain trends and make viable business decisions. This requires a balanced approach to data quality (collecting more data points) versus SLAs (causing noticeable network overhead or significant delays in processing introduced through the delay of collection capabilities). In the scenarios where the home Internet connection is not always of the highest quality, embodiments described herein are used to measure the latency/speed of the networking and make the decision to delegate processing to the IoT device itself, avoiding network overhead. In many use cases, it may be more feasible to open a stream and do the data aggregation and rollups centrally or at an intermediary but, in this scenario, deploying additional processes may be necessary to do standard data aggregation and reduction/compression techniques. The ability to measure the cost of data transfers with a minimal metadata metric, in accordance with embodiments described herein, would provide an overall better economy of resources by ensuring that the scheduling of such processing tasks is done in the most efficient manner possible.

Use case 4: Analysis of large data sets located at disparate labs. Assume a university borrows DNA data from multiple labs to train an algorithm and needs to determine if processing should be completed on rented resources on each site versus copying data to their local lab. In accordance with embodiments described herein, the query and training cost could be broken down in a manner that informs additional variables such as cost to work with various partners and dataset value.

Use case 5: Segmentation of large data sets by cost for training AIML. Assume a lab is working on new algorithms. For the first pass of training, they require at least 50 TB of a 2 PB data set of IoT data for statistical representation and tuning. They need to determine the lowest cost sub-segment of data for pre-processing and ingression and/or ingression and processing. In accordance with embodiments described herein, the training data set for initial processing can be determined by cost and accessibility. If the data set has been processed prior to this run, the data set selection can be further informed by supplying a minimal statistical variance requirement as part of the data selection process.

Figure 4:
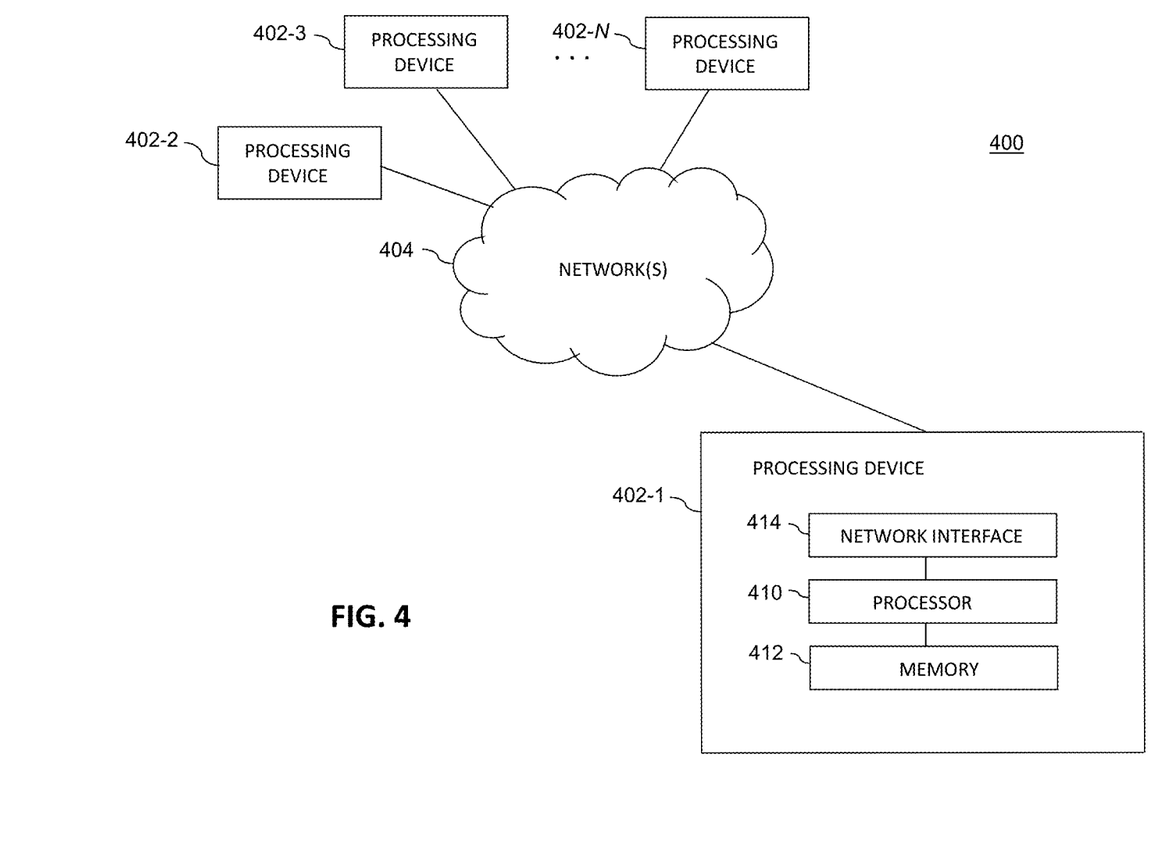
FIG. 4 illustrates a processing platform used to implement an architecture for edge data management in a computing environment, according to an embodiment of the invention.

FIG. 4 illustrates a processing platform used to implement an architecture for improved edge data management in a computing environment, according to an embodiment of the invention. More particularly, processing platform 400 is a processing platform on which a multi-cloud computing environment with improved data management functionalities (e.g., FIGS. 1-3 and otherwise described herein) can be implemented.

The processing platform 400 in this embodiment comprises a plurality of processing devices, denoted 402-1, 402-2, 402-3, . . . 402-N, which communicate with one another over network(s) 404. It is to be appreciated that the methodologies described herein may be executed in one such processing device 402, or executed in a distributed manner across two or more such processing devices 402. It is to be further appreciated that a server, a client device, a computing device or any other processing platform element may be viewed as an example of what is more generally referred to herein as a "processing device." As illustrated in FIG. 4, such a device generally comprises at least one processor and an associated memory, and implements one or more functional modules for instantiating and/or controlling features of systems and methodologies described herein. Multiple elements or modules may be implemented by a single processing device in a given embodiment. Note that each of the one or more centralized computing networks 110, the one or more edge computing networks 120, and edge data management engine 130 can comprise one or more of such processing devices 402 shown in FIG. 4. The network(s) 404 represent one or more communications networks that enable 110, 120 and 130 to communicate and to move data therebetween, as well as to perform other functionalities described herein.

The processing device 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 410. Memory 412 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 412 may comprise electronic memory such as random-access memory (RAM), read-only memory (ROM) or other types of memory, in any combination. The one or more software programs when executed by a processing device such as the processing device 402-1 causes the device to perform functions associated with one or more of the components/steps of system/methodologies in FIGS. 1-3. One skilled in the art would be readily able to implement such software given the teachings provided herein. Other examples of processor-readable storage media embodying embodiments of the invention may include, for example, optical or magnetic disks.

Processing device 402-1 also includes network interface circuitry 414, which is used to interface the device with the networks 404 and other system components. Such circuitry may comprise conventional transceivers of a type well known in the art.

The other processing devices 402 (402-2, 402-3, . . . 402-N) of the processing platform 400 are assumed to be configured in a manner similar to that shown for computing device 402-1 in the figure.

The processing platform 400 shown in FIG. 4 may comprise additional known components such as batch processing systems, parallel processing systems, physical machines, virtual machines, virtual switches, storage volumes, etc. Again, the particular processing platform shown in this figure is presented by way of example only, and the system shown as 400 in FIG. 4 may include additional or alternative processing platforms, as well as numerous distinct processing platforms in any combination.

Also, numerous other arrangements of servers, clients, computers, storage devices or other components are possible in processing platform 400. Such components can communicate with other elements of the processing platform 400 over any type of network, such as a wide area network (WAN), a local area network (LAN), a satellite network, a telephone or cable network, or various portions or combinations of these and other types of networks.

Furthermore, it is to be appreciated that the processing platform 400 of FIG. 4 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the sensor data valuation and management system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
obtaining first information pertaining to a given data set associated with a computing environment, wherein the computing environment comprises one or more edge computing networks and one or more centralized computing networks;
obtaining second information representative of processing functionalities available at the one or more edge computing networks;
obtaining third information representative of processing functionalities available at the one or more centralized computing networks; and
generating a processing location decision for at least a portion of the given data set based on the obtained first, second and third information;
wherein generating the processing location decision comprises:
a determination with respect to a location within the computing environment to process the at least a portion of the given data set; and
obtaining time cost information associated with processing the at least a portion of the given data set at the one or more edge computing networks and at the one or more centralized computing networks, and using the time cost information to perform a cost analysis to make the determination with respect to the location to process the at least a portion of the given data set; and
wherein the obtaining and generating steps are performed via one or more processing devices.

2. The method of claim 1, further comprising obtaining data variance information for the given data set to determine which portion of the data set is statistically significant, and generating the processing location decision for the statistically significant portion of the given data set.

3. The method of claim 2, wherein the determination of which portion of the data set is statistically significant is iterative based on a feedback loop associated with a model training process.

4. The method of claim 1, wherein the processing location decision generating step generates a decision to process the at least a portion of the given data set at the one or more edge computing networks.

5. The method of claim 1, wherein the processing location decision generating step generates a decision to process the at least a portion of the given data set at the one or more centralized computing networks.

6. The method of claim 1, wherein the processing location decision generating step generates a decision to coalesce the at least a portion of the given data set with other data at the one or more edge computing networks, the one or more centralized computing networks, or another computing location.

7. The method of claim 1, further comprising causing the at least a portion of the given data set to be moved from one location in the computing environment to another location in the computing environment based on the processing location decision.

8. The method of claim 1, further comprising generating a graph-based view of the computing environment from the obtained first, second and third information.

9. The method of claim 1, wherein the given data set is an edge data set.

10. The method of claim 1, wherein the processing location decision generating step generates a decision comprising at least two of: a decision to process the at least a portion of the given data set at the one or more edge computing networks; a decision to process the at least a portion of the given data set at the one or more centralized computing networks; and a decision to coalesce the at least a portion of the given data set with other data at the one or more edge computing networks, the one or more centralized computing networks, or another computing location.

11. A system, comprising:
at least one processor, coupled to a memory, and configured to:
obtain first information pertaining to a given data set associated with a computing environment, wherein the computing environment comprises one or more edge computing networks and one or more centralized computing networks;
obtain second information representative of processing functionalities available at the one or more edge computing networks;
obtain third information representative of processing functionalities available at the one or more centralized computing networks; and
generate a processing location decision for at least a portion of the given data set based on the obtained first, second and third information;
wherein generating the processing location decision comprises:
a determination with respect to a location within the computing environment to process the at least a portion of the given data set; and
obtaining time cost information associated with processing the at least a portion of the given data set at the one or more edge computing networks and at the one or more centralized computing networks, and using the time cost information to perform a cost analysis to make the determination with respect to the location to process the at least a portion of the given data set.

12. The system of claim 11, wherein the at least one processor and memory are further configured to obtain data variance information for the given data set to determine which portion of the data set is statistically significant, and generate the processing location decision for the statistically significant portion of the given data set.

13. The system of claim 12, wherein the determination of which portion of the data set is statistically significant is iterative based on a feedback loop associated with a model training process.

14. The system of claim 11, wherein the processing location decision generating step generates a decision comprising one or more of: a decision to process the at least a portion of the given data set at the one or more edge computing networks; a decision to process the at least a portion of the given data set at the one or more centralized computing networks; and a decision to coalesce the at least a portion of the given data set with other data at the one or more edge computing networks, the one or more centralized computing networks, or another computing location.

15. The system of claim 11, wherein the at least one processor and memory are further configured to cause the at least a portion of the given data set to be moved from one location in the computing environment to another location in the computing environment based on the processing location decision.

16. The system of claim 11, wherein the at least one processor and memory are further configured to generate a graph-based view of the computing environment from the obtained first, second and third information.

17. The system of claim 11, wherein the processing location decision generating step generates a decision comprising at least two of: a decision to process the at least a portion of the given data set at the one or more edge computing networks; a decision to process the at least a portion of the given data set at the one or more centralized computing networks; and a decision to coalesce the at least a portion of the given data set with other data at the one or more edge computing networks, the one or more centralized computing networks, or another computing location.

18. An article of manufacture comprising a processor-readable storage medium having encoded therein executable code of one or more software programs, wherein the one or more software programs when executed by one or more processing devices implement steps of:
obtaining first information pertaining to a given data set associated with a computing environment, wherein the computing environment comprises one or more edge computing networks and one or more centralized computing networks;
obtaining second information representative of processing functionalities available at the one or more edge computing networks;
obtaining third information representative of processing functionalities available at the one or more centralized computing networks; and
generating a processing location decision for at least a portion of the given data set based on the obtained first, second and third information;
wherein generating the processing location decision comprises:
a determination with respect to a location within the computing environment to process the at least a portion of the given data set; and
obtaining time cost information associated with processing the at least a portion of the given data set at the one or more edge computing networks and at the one or more centralized computing networks, and using the time cost information to perform a cost analysis to make the determination with respect to the location to process the at least a portion of the given data set.

19. The article of claim 18, wherein the processing location decision generating step generates a decision comprising one or more of: a decision to process the at least a portion of the given data set at the one or more edge computing networks; a decision to process the at least a portion of the given data set at the one or more centralized computing networks; and a decision to coalesce the at least a portion of the given data set with other data at the one or more edge computing networks, the one or more centralized computing networks, or another computing location.

20. The article of claim 18, wherein the one or more software programs when executed by the one or more processing devices further implement the step of causing the at least a portion of the given data set to be moved from one location in the computing environment to another location in the computing environment based on the processing location decision.

\* \* \* \* \*